(12) United States Patent
Bisbee et al.

(10) Patent No.: US 11,301,823 B2
(45) Date of Patent: Apr. 12, 2022

(54) SYSTEM AND METHOD FOR ELECTRONIC DEPOSIT AND AUTHENTICATION OF ORIGINAL ELECTRONIC INFORMATION OBJECTS

(71) Applicant: eOriginal, Inc., Baltimore, MD (US)

(72) Inventors: Stephen F. Bisbee, Baltimore, MD (US); Bryan K. Caporlette, Severna Park, MD (US); Adam J. Attinello, Fulton, MD (US); Valerie F. Daly, Broad Run, VA (US)

(73) Assignee: EORIGINAL, INC., Baltimore, MD (US)

( * ) Notice: Subject to any disclaimer, the term of this patent is extended or adjusted under 35 U.S.C. 154(b) by 331 days.

(21) Appl. No.: 15/764,509

(22) PCT Filed: Oct. 3, 2016

(86) PCT No.: PCT/US2016/055218
§ 371 (c)(1),
(2) Date: Mar. 29, 2018

(87) PCT Pub. No.: WO2017/059454
PCT Pub. Date: Apr. 6, 2017

(65) Prior Publication Data
US 2018/0268380 A1    Sep. 20, 2018

Related U.S. Application Data

(60) Provisional application No. 62/236,495, filed on Oct. 2, 2015.

(51) Int. Cl.
G06Q 20/02 (2012.01)
G06Q 20/04 (2012.01)
G06F 21/64 (2013.01)
H04L 9/08 (2006.01)

(52) U.S. Cl.
CPC ........ G06Q 20/027 (2013.01); G06F 21/645 (2013.01); G06Q 20/042 (2013.01); H04L 9/0825 (2013.01)

(58) Field of Classification Search
CPC .. G06Q 20/027; G06Q 20/042; H04L 9/0825; G06F 21/645
See application file for complete search history.

(56) References Cited

U.S. PATENT DOCUMENTS 5,615,268 A   3/1997   Bisbee et al.
5,748,738 A   5/1998   Bisbee et al.
(Continued)

*Primary Examiner* — John W Hayes
*Assistant Examiner* — Ari Shahabi
(74) *Attorney, Agent, or Firm* — Royal W. Craig; Gordon Feinblatt LLC

(57) ABSTRACT

A system and method for securely and reliably depositing with a Trusted Repository System an authoritative information object executed, using a third, party electronic signing system, or maintained in an intermediary third party storage system having received the original information object from a third, party electronic signing system, such that the TRS may subsequently facilitate electronic transmission, storage, and retrieval of verifiable copies of the stored authenticated authoritative information object without the TRS relinquishing control of the authenticated authoritative information object.

10 Claims, 3 Drawing Sheets

(56) References Cited

U.S. PATENT DOCUMENTS

| | | | |
|---|---|---|---|
| 5,892,900 A * | 4/1999 | Ginter | G06F 21/10 |
| | | | 726/26 |
| 6,233,684 B1 | 5/2001 | Stefik et al. | |
| 6,237,096 B1 | 5/2001 | Bisbee et al. | |
| 6,367,013 B1 | 4/2002 | Bisbee et al. | |
| 7,139,910 B1 | 11/2006 | Ainsworth et al. | |
| 7,162,635 B2 | 1/2007 | Bisbee et al. | |
| 7,743,248 B2 | 6/2010 | Bisbee et al. | |
| 8,924,302 B2 | 12/2014 | Bisbee et al. | |
| 2001/0010045 A1 | 7/2001 | Stefik et al. | |
| 2006/0123249 A1 | 6/2006 | Maheshwari et al. | |
| 2008/0046372 A1* | 2/2008 | Lutnick | G06Q 20/102 |
| | | | 705/51 |
| 2012/0086971 A1* | 4/2012 | Bisbee | G06Q 30/00 |
| | | | 358/1.14 |

* cited by examiner

| Date | Action | Recorded By | Participant | IP Address | Audit |
|---|---|---|---|---|---|
| 9/30/2016 06:15:44 AM EDT | Confirmed Transfer of Control from SSWeb Destination Site Org to Coverage Testing Transfer Recipient | DocuSign Connect | eCore System Acount <support@eoriginal.com> | N/A | X |
| 9/30/2016 06:15:44 AM EDT | Accepted Transfer of Control from SSWeb Destination Site Org to Coverage Testing Transfer Recipient | DocuSign Connect | Transfer Recipient <qatest@eoriginal.com> | N/A | X |
| 9/30/2016 06:15:44 AM EDT | Initiated Transfer of Control from SSWeb Destination Site Org to Coverage Testing Transfer Recipient | DocuSign Connect | eCore System Acount <support@eoriginal.com> | 71.16.78.2 52 | X |
| 9/30/2016 06:15:43 AM EDT | eDeposit Completed Form DocuSign | DocuSign Connect | eCore System Acount <support@eoriginal.com> | 71.16.78.2 52 | X |
| 9/30/2016 06:15:43 AM EDT | Created Signed Version | DocuSign Connect | eCore System Acount <support@eoriginal.com> | 71.16.78.2 52 | X |
| 9/30/2016 06:15:41 AM EDT | Exported Form DocuSign | DocuSign Connect | eCore System Acount <support@eoriginal.com> | 71.16.78.2 52 | X |
| 9/30/2016 06:15:07 AM EDT | Signed Envelope in DocuSign | DocuSign Connect | QA <eoriginalqa@eoriginal.com> | 71.16.78.2 52 | X |
| 9/30/2016 06:14:59 AM EDT | Consented in DocuSign | DocuSign Connect | QA <eoriginalqa@eoriginal.com> | 71.16.78.2 52 | X |
| 9/30/2016 06:14:22 AM EDT | Created in DocuSign | DocuSign Connect | Tyler Earnest <tearnest@eoriginal.com> | 71.16.78.2 52 | X |
| Details | | | Digital Certificate Information | | |
| Block: ENVELOPEid_55373cc829d84A4CB2F835640DB04D96 Date: 09/30/2016 06:15:41 AM EDT Reason: Digitally verifiable PDF exported from www.docusign.com | | | Issued to: DocuSign, Inc. Issued by: Entrust, Inc. | | |
| Block: Vault Tamper Seal Date: 09/30/2016 06:15:43 AM EDT | | | Issued to: TCUP12 Issued by: eOriginal | | |

FIG. 3

SYSTEM AND METHOD FOR ELECTRONIC DEPOSIT AND AUTHENTICATION OF ORIGINAL ELECTRONIC INFORMATION OBJECTS

CROSS REFERENCE TO RELATED APPLICATIONS

The present application derives priority from U.S. Provisional Application Ser. No. 62/236,495, filed 2 Oct. 2015.

BACKGROUND OF THE INVENTION

1. Field of the Invention

The present invention relates generally to systems and methods for providing a verifiable chain of evidence and security for the authentication and deposit of original electronic documents and other information objects in digital formats.

2. Description of the Background

The continuing evolution of methods of commerce is evident in the increasing replacement of paper-based communications and transactions with electronic communications and transactions. When communication is by electronically reproduced messages such as e-mail, facsimile machine, imaging, digital documents, electronic data interchange or electronic fund transfer, however, there no longer exists a handwritten signature or a notary's raised seal to authenticate the identity of a party to a transaction. Further, unlike the words of a document that are largely fixed on a page in a human readable format, the content of an electronically prepared, communicated and executed document stored in machine readable format can be subject to alteration and tampering after execution.

To address these challenges with maintaining the integrity of electronic documents, a third-party operated Trusted Repository System (TRS) has been described that provides secure deposit and authentication of electronic documents and other information objects into a secure and trusted repository. The TRS advantageously utilizes an asymmetric cryptographic system that helps to ensure that a party depositing an information object is electronically identifiable as such, and that the integrity of electronically stored documents and other information objects are protected after deposit and even alter transfer of control of such data, documents and information objects to a transferee. These information objects may include document execution information, electronically signed documents, and other information objects representing or containing information related to the overall transaction. The TRS logically relates all the deposited information objects to the owner of such information objects, such that the owner may verify, monitor, analyze, audit and evaluate the information objects, regardless of whether the owner originated the deposited information objects or received the deposited information objects by transfer after origination.

As an initial matter, it will be helpful to understand the following terminology that is common in the field of secure electronic commerce and communications.

"Public key cryptography (PKC)" is a cryptographic technique that uses a pair of "keys", one private (secret) key and a public key that are associated with respective registered users. The public keys are published for anyone to use for encrypting information intended for the respective users. Only the holder of the paired private key can decrypt and access an electronic information object encrypted with the public key. Conversely, the holder of a user's public key can decrypt and access an electronic information object that was encrypted using that user's private key. The encrypt and decrypt functions of the two keys are truly "one-way", meaning that it is not possible to determine a private key from the corresponding public key, and vice versa, due to the fact that it is currently computationally easy for a computer to identify large prime numbers but extremely difficult for a computer to factor the products of two large prime numbers.

The one-way characteristic of a PKC system also enables a private key holder to "digitally sign" an electronic information object by creating a "hash" of the information object itself and then encrypting the hash with the private key and appending the encrypted hash (now referred to as a digital signature) to the original information object. The hash is produced by applying an algorithm to the information object to be digitally signed, the results of which correspond directly to the information object so that the slightest change in the information object itself will result in a change in the hash. On receipt, a public key holder can verily a digital signature by decrypting the hash and comparing the decrypted hash to a newly computed hash of the information object. If the two hashes match the recipient can be assured that the user appending the signature to the information object was in possessors of the private (secret) key and is thus presumably when they purport to be. Comparison of the newly computed hash to the decrypted hash also verifies that the information object itself has not been altered since it was signed. If the new hash matches the original hash decrypted with the public key then the recipient can be assured that the information object itself has not been altered as even the slightest change in the information object itself will result in the two hashes not matching. Example PKC algorithms that comply with government and/or commercial standards include the digital signature algorithm (DSA/RSA) and secure hash algorithm (SHA-1/MD5).

A "digital signature" is a cryptographically created data element that is logically associated with, applied or otherwise appended to an electronic information object with the intent of the creator to indicate their assent to the information contained in the information object or their willingness to be otherwise bound by the terms or conditions recited in the information object. As described, a digital signature is typically created by "hashing" an information object and encrypting the resulting hash (integrity block) using the signer's private (secret) key and thereafter appended to the information object.

An "electronic signature" is any one of the mechanical, holographic, digital, voice, video or biometric signatures, or such other electronic sound, symbol, picture, or process that is logically associated, applied or attached to an electronic document with the intent or commitment of the signer to sign or otherwise be bound by the terms of the electronic document. Electronic signatures may contain additional information about the signer (e.g., name, email address, etc.) and the signing event (e.g., reason, date and time, place, etc.).

An "authentication certificate" is as unforgeable data element that binds a user's public key to that user's identity information and that advantageously, but not necessarily, conforms to the international standard X.509 version 3, "The Directory-Authentication Framework 1988", promulgated by the International Telecommunications Union (ITU). Authentication certificates are issued by a Certificate Authority (CA) that is a known entity and is responsible for ensuring the unique identification of all of its users and both source and content integrity of the information contained in the certificate. An authentication certificate is created when a CA uses its own private key to digitally sign (i.e. hash and encrypt) an individual's public key along with certain of the individual's identifying information (name, location etc.) and certain information regarding the certificate itself (issuer, expiration date etc.). The act of digitally signing by the CA makes a certificate substantially tamper-proof such that further protection is not needed. The intent of the certificate is to reliably associate (bind) a riser's identity to the user's public cryptographic key.

Each authentication certificate includes the following critical information needed in the signing and verification processes: a version number, a serial number, an identification of the Certification Authority (CA) that issued the certificate, identifications of the issuer's hash and digital signature algorithms, a validity period, a unique identification of the user who owns the certificate, and the user's public cryptographic signature verification key.

Certificate extensions can also be used as a way of associating additional attributes with users or public keys, and for managing the public key infrastructure certificate hierarchy. A user's authentication certificate is advantageously and preferably appended to an electronic information object that the user has digitally signed with the user's private key so that it is possible to verify the digital signature by decrypting the user's public key with the known and trusted CA's public key. Alternatively, the certificate may be retrieved from the issuing CA or directory archive.

The "Public Key Infrastructure (PKI)" is the hierarchy of CAs responsible for issuing authentication certificates and certified cryptographic keys used for digitally signing and encrypting information objects.

A "wrapper" is used to securely hold and associate digital or electronic signatures with part or all of one or more electronic information objects contained therein. Wrappers may take the form of any open standard enveloping or information object (document) formatting schemas. Two examples are the RSA Public Key Cryptographic Standard (PKCS) #7 and the World Wide Web Consortium (W3C) Extensible Markup Language (XML) Signature Syntax and Processing Draft Recommendation. The RSA PKCS #7 standard supports zero, one, and multiple parallel and serial digital signatures (cosign and countersign). An unauthenticated attribute is not protected. Some other formats that provide support for signature syntax, processing and positioning (tags) are S/MIME, HTML, XHTML, and XFDL. Any of these wrapper formats can be applied recursively and markup languages extended to provide signature and protection layering.

As described in U.S. Pat. Nos. 5,615,268, 5,748,738, 6,237,096, 6,367,013, 7,162,635, 7,743,248, and 8,924,302 to Bisbee et al., an original electronic document or information object having the same legal weight as a blue-ink-signed paper document (e.g., a negotiable instrument or chattel paper) is made possible by contract and by PKI and associated computer technology. An electronic document, or more generally an information object, is created and transferred to a Trusted Repository System (TRS) that is specifically designed and empowered by contract to securely and reliably store any such object for its full effective life. The contractual aspect is an agreement between the TRS and the party submitting or relying on the electronically signed information object to accept reliance on the TRS as the custodian of the information objects.

The TRS implements defined business rules for information objects handled by the TRS (i.e., a complete set of authorized actions). The TRS also implements a defined security policy (i.e., a set of protective measures that is necessary to prevent unauthorized actions). The TRS uses its business rules and security policy to govern requests and access to the TRS over the respective file cycles of all documents and other information objects within its control verifying the identities and authorities of parties (local and remote) requesting access. The TRS securely stores and securely retrieves digitally signed, authenticated, and encrypted information objects such as electronic documents. Upon request, the TRS prints and issues certified copies of information objects. The TRS advantageously supports a multi-port token server for proving information object authenticity, for verifying the identities of signing parties, and for authenticating information object submissions. The TRS provides for backup and disaster recovery, and ensures that stored information is not lost within a specified retention period, whether that period is specified by a user, law, or regulation.

With all of the advantages of original electronic information objects that are provided by the U.S. patents cited above, it is important to realize that copies of an information object that exist outside of the control of a TRS must not be able to be mistaken for the original information object. For certain transactions, this is a compliance requirement of with various Federal and State laws. Such laws include State enactments of the Uniform Commercial Code (UCC) § 9-105, which provides a legislative framework that gives secured parties the ability to implement electronic systems for keeping track of and controlling "electronic chattel paper" (documents that evidence both a monetary obligation and a security interest). For electronic chattel paper, UCC § 9-105(a) requires the secured party to maintain a system (such as the TRS with which a secured party may contract) employed for evidencing the transfer of interests in the electronic chattel paper, which system reliably establishes the secured party as the person to which the chattel paper was assigned. The UCC also provides more detailed specifications for such a system which will meet the broad requirements of § 9-105(a). Such a system must create, store, and assign electronic chattel paper in such a manner that:

(1) a single authoritative copy of the record or record's exists which is unique, identifiable and, except as otherwise, provided in (4), (5) and (6) below, unalterable;

(2) the authoritative copy identifies the secured party as the assignee of the record or records;

(3) the authoritative copy is communicated to and maintained by the secured party or its designated custodian;

(4) copies or amendments that add or change an identified assignee of the authoritative copy can be made only with the consent of the secured party;

(5) each copy of the authoritative copy and any copy of a copy is readily identifiable as a copy that is not the authoritative copy; and (6) any amendment of the authoritative copy is readily identifiable as authorized or unauthorized.

As shown in the above, an information object may be effective as a blue-ink-signed paper document provided that a controlled, secure method of deposit is utilized with a system such as the TRS that reliably and securely stores original information objects for their full effective lives.

SUMMARY OF THE INVENTION

Applicants' invention solves these and other problems incurred by prior approaches with a software-based method and system that provides secure and reliable deposit into a Trusted Repository System (TRS) of an authoritative information object which was electronically signed and maintained using one or more third party systems, such that the TRS may subsequently facilitate electronic transmission, storage, and retrieval of verifiable copies of the stored authenticated authoritative information object without the TRS relinquishing control of the authenticated authoritative information object.

In addition, Applicants' invention provides a means for depositing authoritative information objects into the TRS which can be implemented on commercially available computer hardware to create an integrated closed system for authentication of information objects such as electronic documents.

Copies of an information object that exist outside of the control of a TRS must not be able to be mistaken for the original information object. Therefore, one portion of the overall workflow that is prone to risk, at least in conventional systems, is the initial deposit of the authoritative electronic information object with the TRS. Applicant's process entails exporting an electronically signed information object, such as an electronic document, from a third party electronic signing system (such as, for example Docusign® or AdobeSign® formerly Echosign®), or from an intermediary third party storage system having received an electronically signed information object such as a document from a third party electronic signing system, and depositing it with the TRS as an authoritative original information object. After receipt of a notice from a third party signing or storage system that an information object is ready for deposit, the TRS creates an entry to hold the information object and then exports the signed information object from the third party system, along with any available metadata and other information regarding the creation, execution, and storage history of the signed information object. The TRS then requires a certification from the third party system as to the authenticity and uniqueness of the information object by verifying that the deposited information object is now the only authoritative and original copy. Successful authenticity verification attests to the legitimacy of the submitted information object. The TRS then creates the original authenticated information object by appending a date-time stamp and its digital signature and certificate. This TRS action establishes and demonstrates the TRS' assumption of control of the original authenticated information object. The present invention provides a method and system for more reliable computer-implementation of the electronic deposit with the TRS of an original authenticated information object.

BRIEF DESCRIPTION OF THE DRAWINGS

FIG. 3 is a depiction of a sample audit trail associated with a deposited authenticated original information object.

DETAILED DESCRIPTION OF THE PREFERRED EMBODIMENT

Applicants' invention is a method and system for securely and reliably authenticating and depositing an original information object with a Trusted Repository System (TRS), such that the TRS may subsequently facilitate electronic transmission, storage, and retrieval of verifiable copies of the stored authoritative information object without the TRS relinquishing control of the authoritative information object. As described above, the TRS is a third-party trusted repository that is specifically designed and empowered by contract to securely and reliably store any such information object for its full effective life. The TRS is contractually bound by agreement between the TRS and the party(ies) submitting or relying on the authoritative information object to accept reliance on the TRS to serve as a repository and custodian of the authenticated authoritative information object.

The Computer Architecture

The invention can be implemented utilizing commercially available computer hardware to create an integrated closed system for authentication of electronic information objects such as documents, as will be defined below.

Figure 1:
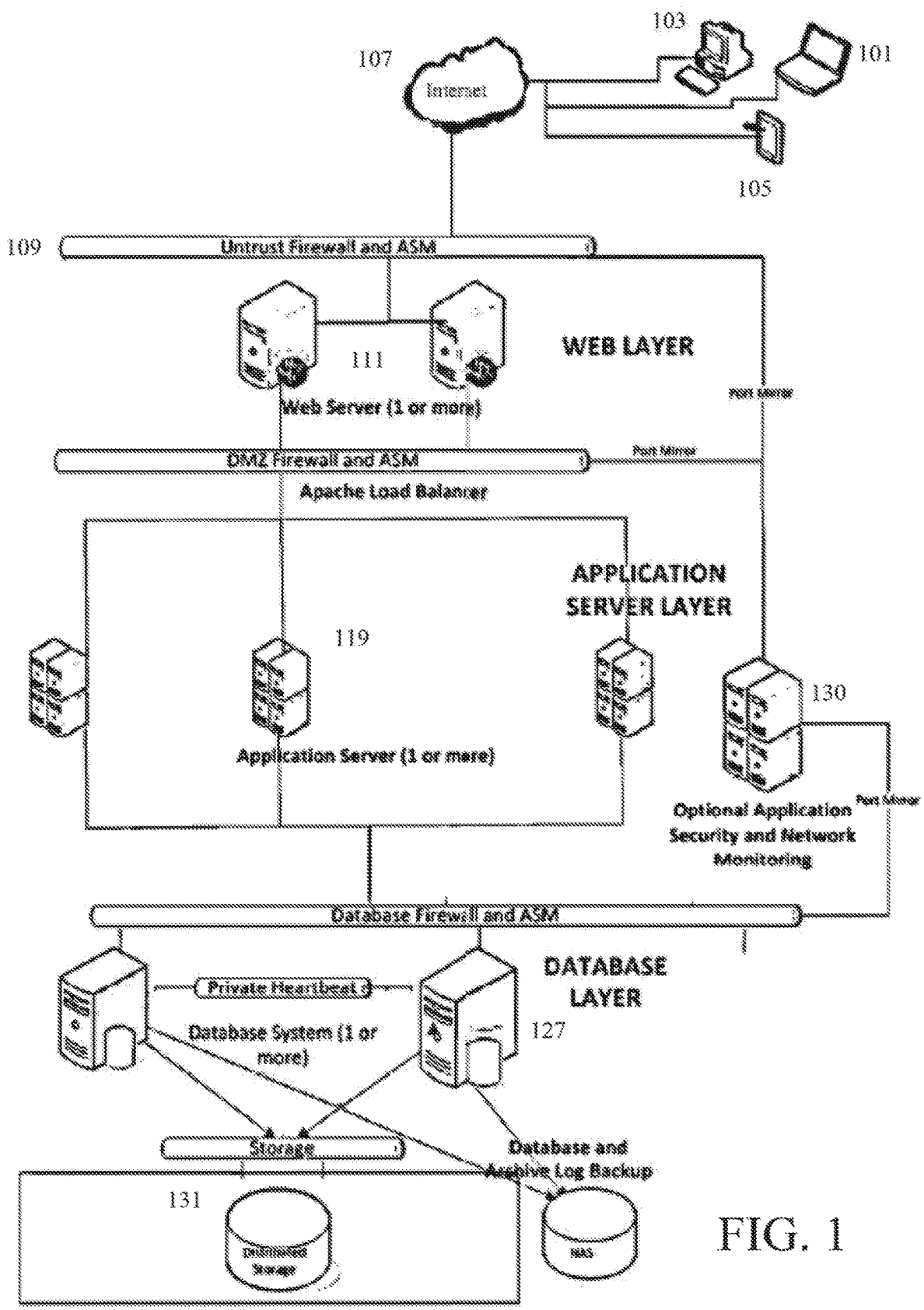
FIG. 1 is a schematic view of a Trusted Repository System (TRS) architecture.

With reference to FIG. 1, a diagram of a high availability, secure trusted repository system architecture is provided that ensures the security of the authoritative copy of an information object, such as an electronic document, and any affixed electronic signatures or information. All computing components behind the firewall 109 are housed in a physically secure facility and make up the components of the trusted repository system (TRS). Strong authentication is required for client workstations, devices and systems to access the TRS and no TRS resource can be accessed directly. Authorized instructions that may accompany pay loads (e.g. electronic documents, electronic signature blocks, etc.) are required to request and receive TRS services.

An Internet browser running on a workstation such as a laptop 101, PDA 105 or desktop 103 equipped with an input device such as a mouse, keyboard, stylus, or voice to text conversion, is required for client access to the TRS.

The workstation transmits a request protected through the use of X.509 certificates and asymmetric cryptography to authenticate the counterpart with whom they are communicating, and to negotiate a symmetric session key (such as TLS of SSL) via the Internet 107 or other data network to the firewall 109 which forwards the request to a web server 111. The web server 111 acts on the request and forwards the instruction and/or pay load to any available application server 119. The application server 119 performs the requested actions, applying, storing, retrieving, auditing, sealing, authenticating, etc. electronic information objects that are stored and retrieved using a database management system (DBMS) 127. Actual storage media can be handled externally by a storage area network 131. All network and application traffic can be mirrored to an external application security module 130 for intrusion detection and prevention monitoring and alerting. The TRS necessarily performs all requested authorized actions without ever disclosing the actual authoritative copy of the information object, such as an electronic document. The TRS provides centralized support for a distributed network of clients and supports a wide range of present and future e-commerce applications by providing a secure, standards-based foundation upon which business applications can be and are built.

TRS Chain of Trust

Applicants' invention is, in general terms, an eight-step, software-implemented process which combines business and technical procedures to achieve a more reliable authentication and deposit of an information object with the TRS as the authenticated and authoritative copy of such information object.

Figure 2:
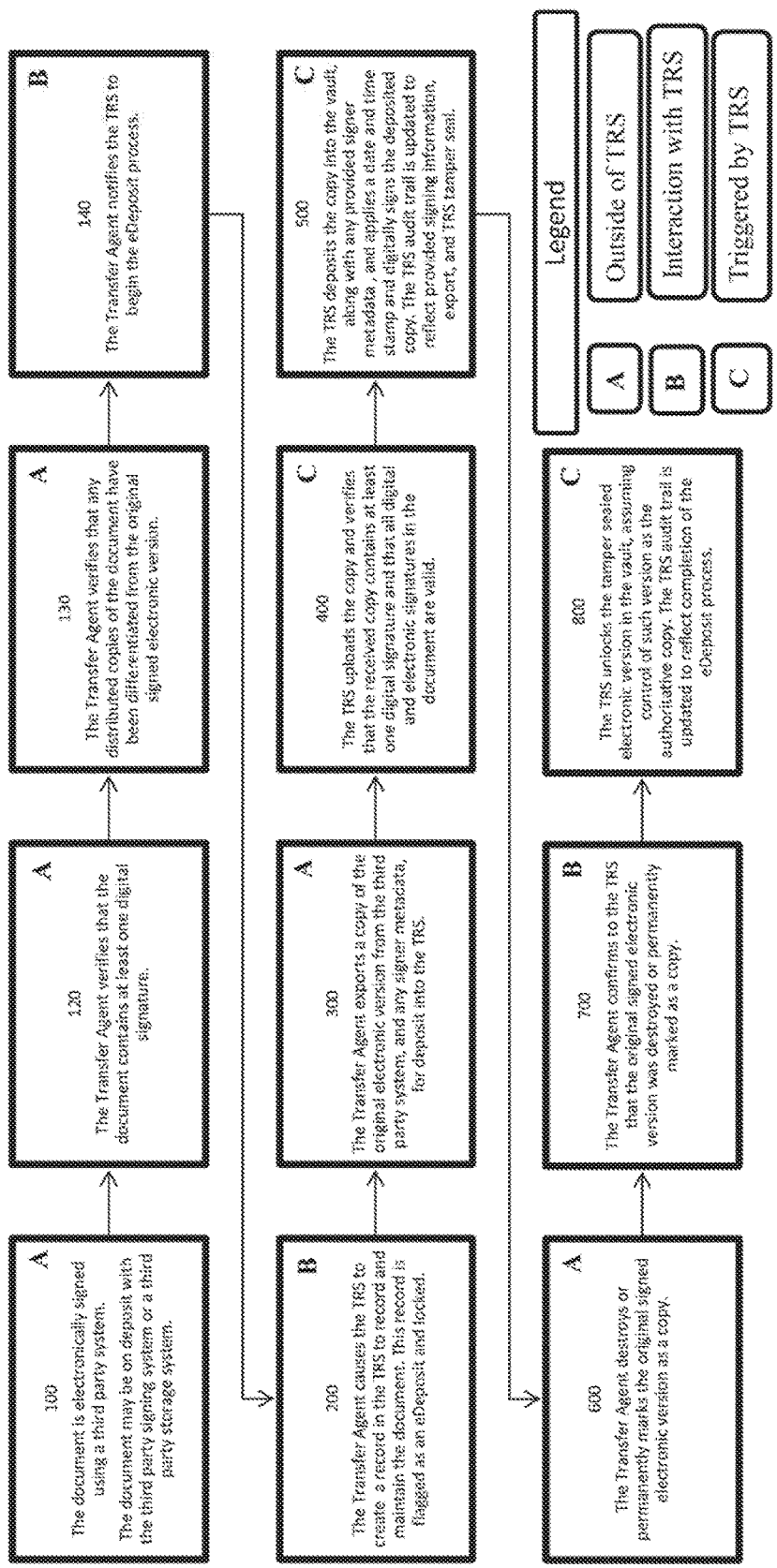
FIG. 2 is a flowchart illustrating the eight steps (100-800) and sub-steps (120-140) of the method according to the present invention.

FIG. 2 is a block diagram illustrating the eight basic steps 100-800 of at least one embodiment of Applicants' process in the context of the overall method of submitting and depositing an original information object to the TRS.

An original insinuation object is itself an information object, and the underlying formatting of an original information object enables parsing and processing for performing verification and validation of one or more of its electronic signatures, and extraction of the original contents tor viewing or processing.

With reference to FIG. 2, typically, at step 100, the information object consisting of an electronic document is electronically created and electronically signed by all signatory parties, based on the purpose and content of the information object, utilizing a third patty signing system (such as, for example, DocuSign® or AdobeSign® formerly EchoSign®). The information object may be stored at the third party signing system or alternatively with an intermediary third party storage system having received an electronically signed document or information object from a third party electronic signing system. According to the methods of the present invention, a hard copy, pen-and-ink document containing the information embodied in the information object is never created. The electronic document information object is embodied in a solely electronic form from the time of its inception.

As used herein, the term "Transfer Agent" refers generally to an entity (or an individual user or third party system acting on behalf of such entity) which attests to the integrity and validity of an information object before it is submitted to the TRS and which is authorized to submit such information object to the TRS. In addition, for the sake of clarity, the term "original information object" will be used to refer to an authenticated information object created by a process involving the TRS and a Transfer Agent, and the term "transaction" will be used to refer to a deal or account that corresponds to or is defined by a set of original information objects. An "formation object" as used herein may be an electronic document or any other data, such as electronic media content, that is stored in a computer-readable format.

The Transfer Agent enters into the third party system, or the third party system otherwise generates, pertinent metadata describing the transaction. Metadata are high-level summary data that describe a transaction—analogous to the metatags that are associated with World Wide Web pages and that are used by Internet search engines in searching for information. For purposes of the present invention, the pertinent metadata includes information surrounding the signature process related to the information object source file. This metadata is submitted along with a computer-generated image of the information object or electronic document, and includes, but is not limited to, at least the following metadata:

1. Each signer's full name;
2. Each signer's authentication method;
3. The date and time of each signer's consent; and
4. The date and time each signer signed the electronic document.

The Transfer Agent accepts custody of the information object and authenticates it. Prior to submitting the information object to the TRS, the Transfer Agent must attest to its integrity and validity, and so the Transfer Agent (acting on behalf of the TRS) must take certain affirmative pre-qualification steps. More specifically, at step 120, the Transfer Agent verifies that the information object source file, which was originated as an electronic document file, bears at least one verifiable digital signature. At step 130, the Transfer Agent verifies that no undifferentiated copies of the information object have been distributed prior to beginning the electronic deposit process. This ensures that all copies made or distributed of the signed information object source file are marked as copies by digital watermarking or the like.

At step 140, the Transfer Agent provides notice to the TRS that an information object residing on a third party system is ready tor submission to the TRS, and that the Transfer Agent will attest to its integrity and validity.

After successful completion of steps 100-140, including the Transfer Agent verification at step 120, the TRS implements the following seven basic steps 200-800 in accordance with Applicants' invention to securely and reliably deposit the information object with the TRS as an original information object.

Upon receiving notice, at step 200, the TRS initiates the electronic deposit process by creating a record entry in Database Layer 127 (FIG. 1) to hold and record the electronic deposit. The record entry may be, for example, a tuple (e.g., single, structured data item in a relational database table). In certain embodiments of the present invention, the Transfer Agent causes the TRS to create such record entry. Such embodiments include implementations of the present invention wherein the Transfer Agent is a user on behalf of such entity Transfer Agent. In either case, importantly, immediately after creation of the record entry, the TRS places a secure lock on the record entry against any third party access to ensure that no other action outside of the electronic deposit process is taken before completion of said process.

After creating the record entry, at step 300 the TRS exports a copy of the information object source file (image file and any available metadata) from the third party system. In certain embodiments of the present invention, the Transfer Agent performs such export in lieu of the TRS.

At step 400, upon receipt of fee exported information object source file, the TRS uploads such file and verifies that the information object contained in the source fib contains at least one digital signature and that all digital signatures, and all electronic signatures, in the information object are valid.

Upon completion of such verification, the TRS at step 500 deposits the information object source file into the record entry created at step 200. Automatically upon deposit, the TRS then digitally tamper-seals the submitted information object. Specifically, the TRS appends a date and time stamp and its digital certificate to the files using industry standard digital certificate technology. Preferably, the tamper seal is accomplished with an X.509 digital certificate issued by a certification authority to the TRS. The X.509 digital certificate associates the TRS identity with a public key value. More specifically, the certificate includes at least: (1) the TRS identity (the certificate owner); (2) the public key associated with the TRS; (3) X.509 version information; (4) a serial number that uniquely identifies the certificate, (5) the certification authority; (6) the digital signature of the TRS; and (7) information about the algorithm used to sign the digital signature. The digital signature applied by the TRS eliminates the possibility of unauthorized alteration or tampering with an information object subsequent to its sealing. In addition, the TRS's digital signature can advantageously provide for non-repudiation, i.e., precluding the Transfer Agent from disavowing the object.

Furthermore, upon deposit to the TRS, the TRS creates an "audit trail" record, e.g., a record consisting of a sequential listing of audit entries representing important events and interactions conducted with respect to the information object source file, which record is digitally signed by the TRS to make such record tamper evident. The audit trail record may be housed in TRS database 127 using a means by which it may be associated with the original information object for review. The TRS formats the audit trail such that it includes suitable instructions for parsing and processing its contents. A convenient form of wrapper (e.g., PEM, RSA PKCS#7, or S/MIME) or markup language (e.g., HTML, XML, or XFDL) can be used for this purpose. The contents can be one or more information objects, date-time stamps, digital signatures and matching certificates, electronic signatures, and/ or indicators, which include, but are not limited to, content types, object identifiers, and encoding rules and tags. In the case of the audit trail, the contents of the wrapper consist of audit entries and the TRS date and time stamp and digital signature and certificate. Each time additional audit entries are added to the audit trail, the TRS combines the new entries with the existing digitally signed entries and applies a recursive wrapper over the package to provide signature and protection layering.

Upon creation of the audit trail for a source file, the TRS populates the audit trail with any provided metadata surrounding the signature process related to the source file. Such events may include creation of the source file in the third party system and the application of each electronic signature to such source file as shown in FIG. 3. In certain embodiments of the present invention, such metadata is not available to be delivered to the TRS in metadata format. In such instances, the TRS creates a second record entry in the TRS which is logically associated with the initial record entry containing the information object, creates a file containing the signing information provided by the third party system, and deposits such file into the second record entry. The TRS further populates the audit trail with events representing the export of a copy of the source file from the third party signing system and deposit of such copy into the TRS. See FIG. 3.

After the copy of the source file has been successfully deposited into the TRS-locked record, and the audit trail has been created, populated using any provided metadata, and populated with events documenting deposit of the source file with the TRS at step 500, then at step 600 the TRS notifies the Transfer Agent to destroy or otherwise permanently mark the information object source file as a non-original object. Step 600 is paramount to being able to prove, via documented and enforced policies or other artifacts, that the original source file and all copies thereof existing outside of the TRS have been destroyed or otherwise permanently marked and that the Transfer Agent treats and identifies the version held in the TRS as the sole and authoritative original information object.

At step 700, the Transfer Agent provides notice to the TRS that the destruction or permanent marking of the original source file and all copies thereof has been completed. The confirmation information, including identity, time/date of destruction, and file/copy destroyed or marked as a copy, is appended to the recorded audit trail maintained by the TRS. In certain embodiments of the present invention wherein the Transfer Agent is a third party signing system on behalf of such entity Transfer Agent, this destruction step 700 may occur immediately upon completion of export of the source file at step 300. In such embodiments, the export process of the third party signing system sends to the TRS the executed information object and signing information in encrypted format and the public key for such encryption. Upon receipt of the export, the TRS runs a hash of the encrypted export package using the public key, and returns the hash to the third party signing system. If the hash matches the hash of the encrypted export package of the information object source file prepared by the third party signing system prior to export, the third party signing system then sends the TRS the private key to decrypt the encrypted export package and destroys or permanently marks the original source file and all copies thereof.

At step 800, the TRS then automatically removes the lock on the now authoritative original information object, and the recorded audit trail associated with the information object is updated with an audit entry to denote completion of the electronic deposit process. This action by the TRS marks the TRS's assumption of custody and control of the original information object as the authoritative copy.

Secure audit, record tracking, and record management complete the technological aspects of maintaining an original information object. The TRS vault stores the authenticated authoritative original information object in an account and controls access to the account for the benefit of the account owner and activities permitted with respect to original information objects stored in the account. The original information objects are stored and the corresponding accounts are maintained by the TRS in any convenient form of memory, such as on optical and/or magnetic disks. Once a transaction is completed and the associated original information object(s) are deposited into the TRS, the set of authorized parties who can access the TRS to obtain or further transmit an original information object may change.

The authoritative original information object is never disclosed or rendered by the TRS in its original state. Any copy of said information object must contain at least one forgery-resistant indicium or watermark that clearly identifies the rendered information object as a copy of the authoritative original information object held at the TRS. This combination of actions by the TRS, in conjunction with a protected audit trail, can be used at a future date to prove conclusively that a party initiated a transaction, precluding a Transfer Agent from denying that the original information object originated with that Transfer Agent and providing irrevocable proof of authenticity.

A validated instruction will cause the TRS to communicate the marked copy of the authoritative original information object to the designated remote workstations. An encrypted connection, such as TLS, is used to protect communications between the TRS and designated workstations. In addition, the workstation incorporates methods that accurately parse and accurately display the TRS marked copy of the authoritative original information object.

Where security is required to guarantee that the information object received at a remote workstation is a valid copy of the authoritative authenticated original information object deposited in the TRS, the TRS appends its digital signature and certificate to the marked copy of the authoritative original information object prior to transmission. The workstation rejects the marked copy as fraudulent if the TRS digital signature and certificate fail to test as valid. The workstation notifies the TRS to report the problem. The TRS retransmits the digitally signed marked copy of the authoritative original information object. Appropriate actions are initiated by the TRS if the TRS failed to transmit the marked copy of the authoritative original information object.

The above-described embodiment is for the purpose of promoting an understanding of the principles of the invention. It should nevertheless be understood that no limitation of the scope of the invention is thereby intended, such alternations and further modifications in the illustrated device, and such further applications of the principles of the invention as illustrated herein being contemplated as would normally occur to one skilled in the art to which the invention relates.

STATEMENT OF INDUSTRIAL APPLICABILITY

The continuing evolution of methods of commerce is evident in the increasing replacement of paper-based communications and transactions with electronic communications and transactions. Unlike the words of a document that are largely fixed on a page in a human readable format, the content of an electronically prepared, communicated and executed document stored in machine readable format can be subject to alteration and tampering after execution, a critical risk in financial and other commercial transactions. Therefore, there would be great industrial applicability in a software-based method and system providing secure and reliable deposit into a Trusted Repository System (TRS) of an authoritative information object which was electronically signed and maintained using one or more third party systems, such that the TRS may subsequently facilitate electronic transmission, storage, and retrieval of verifiable copies of the stored authenticated authoritative information object without the TRS relinquishing control of the authenticated authoritative information object.

We claim:

1. A method for securely depositing an electronic information object into a trusted repository computer system, comprising the steps of
    an authorized transfer agent accepting custody of said electronic information object, verifying that no other copies of said electronic information object exist that are not marked as copies, attaching a verifiable digital signature to said electronic information object indicating said verification, and sending notice of said verification to said trusted repository computer system;
    said trusted repository computer system receiving said notice of said verification by said authorized transfer agent;
    said trusted repository computer system creating a first electronic record to receive submission of said verified electronic information object and locking said first electronic record against third party access;
    exporting a copy of said verified electronic information object;
    said trusted repository computer system uploading the copy of said verified electronic information object onto the trusted repository system, verifying that said copy of said electronic information object contains at least one digital signature, and verifying the validity of all digital signatures and electronic signatures in said copy of said electronic information object;
    said trusted repository computer system depositing said verified copy of the electronic information object to said first electronic record in said trusted repository computer system, and applying a date and time stamp and digital signature authenticating said trusted repository computer system to said verified electronic information object;
    said trusted repository computer system establishing an audit trail corresponding to said first electronic record containing said deposited verified copy of said electronic information object populating said audit trail with entries corresponding to the steps of uploading a copy of said verified information object onto the trusted repository system, verifying that said copy of said electronic information object contains at least one digital signature, and verifying validity of all digital signatures and electronic signatures in said copy of said electronic information object, and applying a digital signature and date-time stamp to said populated audit trail;
    said trusted repository computer system receiving from said authorized transfer agent, certification that the authorized transfer agent has destroyed all copies of said electronic information object or has marked all copies of said electronic information object such that said deposited verified copy of said electronic information object now stored in the trusted repository computer system is a one-and-only authoritative original electronic information object;
    said trusted repository computer system unlocking the record in the trusted repository computer system now containing the one-and-only authoritative original electronic information object to allow third party access; and
    said trusted repository computer system updating, after said step of said trusted repository computer system unlocking the record, said audit trail with an entry indicating that said that said deposited verified copy of said electronic information object now stored in the trusted repository computer system is the one-and-only authoritative original electronic information object, and applying, by said trusted repository computer system, a digital signature and date-time stamp to said updated audit trail;
    said trusted repository system designating the electronic information object residing in the trusted repository computer system to be the one-and-only authoritative original electronic information object.

2. The method of claim 1, further comprising a step of said authorized transfer agent initiating a request, and wherein said step of said trusted repository computer system creating said first electronic record is initiated by said request made by the authorized transfer agent.

3. The method of claim 1, further comprising a step of said authorized transfer agent initiating a request, and wherein said step of said trusted repository computer system uploading a copy of said verified information object is initiated by said request made by the authorized transfer agent.

4. The method of claim 1, wherein:
    said step of said trusted repository computer system uploading a copy of said verified electronic information object further comprises uploading signer metadata from a third party computer system regarding information related to an electronic signing process which created said electronic information object; and
    said step of said trusted repository computer system populating said audit trail with entries further comprises populating said audit trail with entries corresponding to signing events contained within said signer metadata.

5. The method of claim 4, wherein:
    said step of said trusted repository computer system uploading a copy of said verified electronic information object further comprises uploading a second electronic information object from said third party system regarding information related to an electronic signing process which created said second electronic information object;
    said method further comprising the steps of:
        creating, by said trusted repository computer system, a second electronic record to receive submission of said second electronic information object and relating said second electronic record to said first electronic record;

said trusted repository computer system locking said second record to ensure that no other action is taken during the submission process;

said trusted repository computer system depositing said second electronic information object into said second record and applying a date and time stamp and digital signature authenticating said trusted repository computer system to said deposited copy of said second electronic information object; and said trusted repository computer system establishing a second audit trail corresponding to said second electronic record containing said deposited copy of said second electronic information object, populating said second audit trail with an entry corresponding to the deposit and tamper seal of said copy of said second electronic information object, and applying a digital signature and date-time stamp to said updated second audit trail.

6. The method of claim 1, wherein:

said step of said trusted repository computer system uploading a copy of said verified electronic information object further comprises uploading signer metadata from said third party system regarding information related to the electronic signing process which created said electronic information object;

said method further comprising the steps of:

said trusted repository computer system creating a second electronic record to receive submission of said signer metadata and relating said second electronic record to said first electronic record;

said trusted repository system locking said second electronic record to ensure that no other action is taken during the submission process;

said trusted repository computer system creating a document image depicting said signer metadata;

said trusted repository computer system depositing said document image into said second record and applying a date and time stamp and digital signature of such trusted repository system to said deposited copy of said second electronic information object; and said trusted repository computer system establishing a second audit trail corresponding to said second electronic record containing said deposited copy of said second electronic information object, populating said second audit trail with an entry corresponding to the deposit and tamper seal of said copy of said second electronic information object, and applying a digital signature and date-time stamp to said updated second audit trail.

7. The method of claim 1, further comprising, after completion of said step of said trusted repository computer system uploading a copy of said verified electronic information object further, the steps of:

said trusted repository computer system receiving a private key said trusted repository computer system using said private key to create a hash of the uploaded verified electronic information object and a public key for decryption of said hash and sending, by said trusted repository, to said authorized transfer agent the hash and public key said trusted repository computer system receiving from said authorized transfer agent, certification that the authorized transfer agent has destroyed all copies of said electronic information object or has marked all copies of said electronic information object such that said copy of said uploaded verified electronic information object now stored in the trusted repository computer system is a one-and-only authoritative original information object.

8. The method of claim 1, wherein said authorized transfer agent is an authorized user representative of an entity authorized to make deposits to the trusted repository computer system.

9. The method of claim 1, wherein said authorized transfer agent is a third party signing system acting on behalf of an entity authorized to make deposits to the trusted repository computer system.

10. The method of claim 1, wherein said authorized transfer agent is a third party storage system acting on behalf of an entity authorized to make deposits to the trusted repository computer system.

* * * * *